Patented Oct. 13, 1942

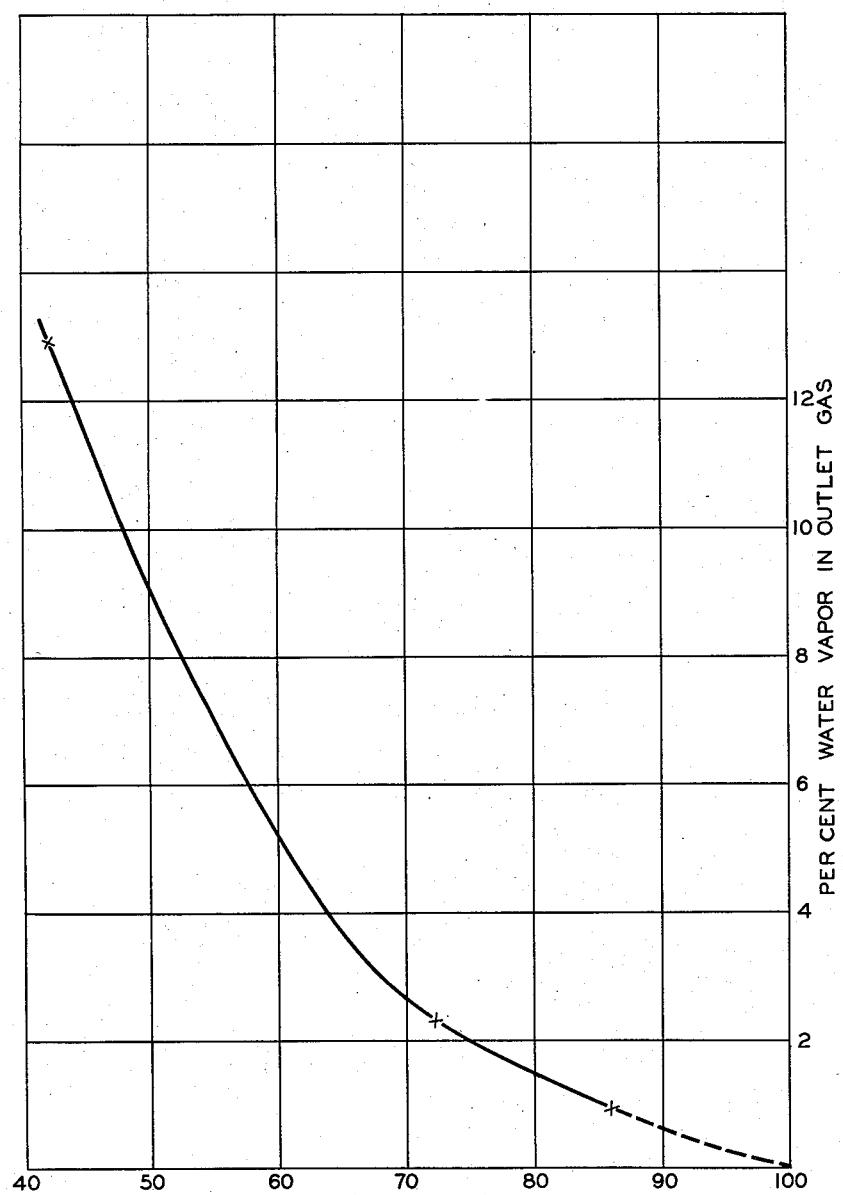
FIG. I PER CENT REMOVAL OF HYDROGEN SULFIDE

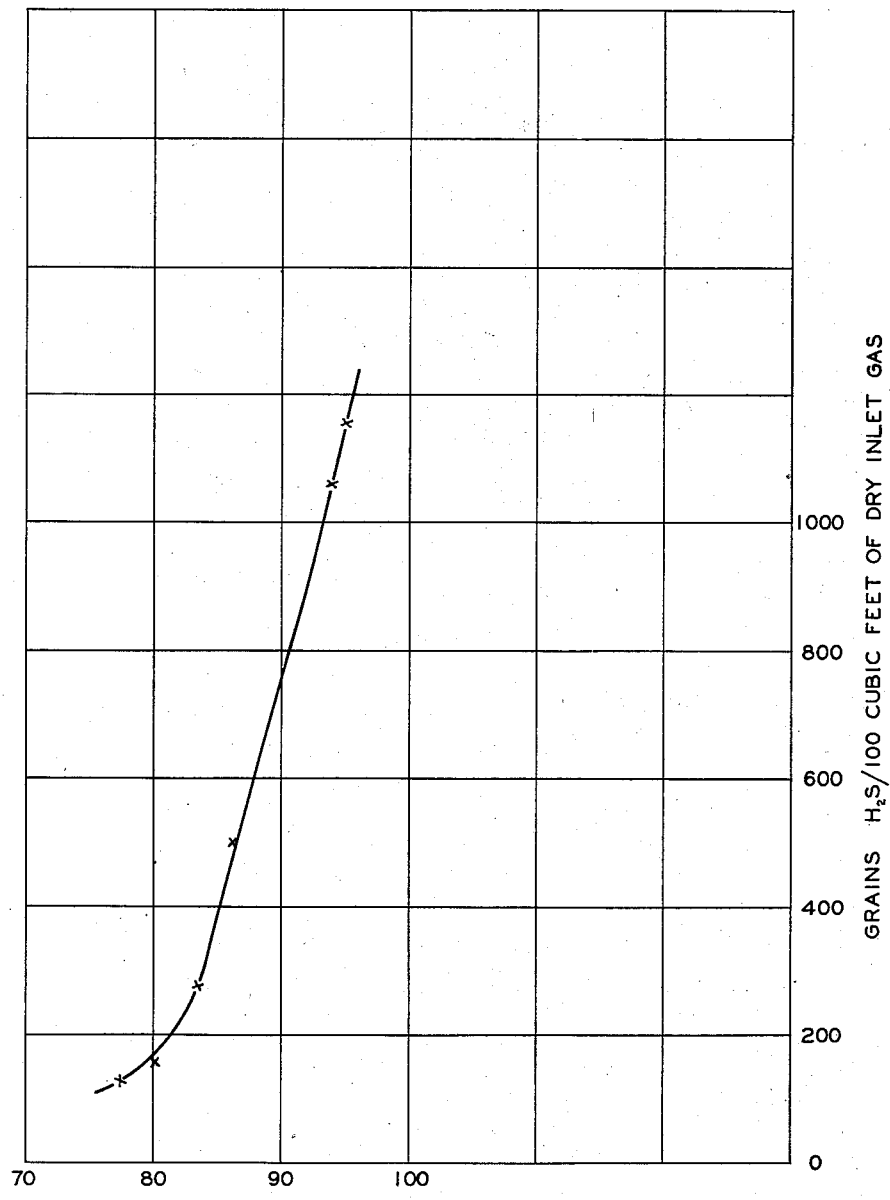
FIG. 2 PERCENTAGE REMOVAL OF H₂S

2,298,641

UNITED STATES PATENT OFFICE 2,298,641

TREATMENT OF HYDROCARBON GASES

Walter A. Schulze and James R. Owen, Bartlesville, Okla., assignors to Phillips Petroleum Company, a corporation of Delaware Application February 17, 1940, Serial No. 319,534

7 Claims. (Cl. 23—225)

This invention relates to the removal of hydrogen sulfide from gases, and it has specific application to the treatment of gaseous hydrocarbons from any source, including natural gas, refinery gases, and fuel gas for the removal therefrom of hydrogen sulfide.

The natural gas produced in many localities is contaminated with hydrogen sulfide in varying amounts, ranging from 0.1 per cent or less up to as high as 10 per cent by volume or from about 60 or less to about 6000 grains per 100 cubic feet of gas. In many instances, natural gas before it is acceptable for domestic or industrial uses must be treated to lower the content of hydrogen sulfide. In addition, the hydrocarbon gases associated with the production of crude petroleum oil and with the refining and manufacturing of petroleum products often contain hydrogen sulfide in amounts which render them objectionable and requiring purification.

The presence of hydrogen sulfide in gases of the type mentioned is objectionable from the standpoint of odor and corrosiveness, also, if the gases are to be used as fuel, because of the production of sulfur oxides during combustion. Further, hydrogen sulfide in hydrocarbon refinery gases is a potential source of sulfur and sulfur compounds in petroleum products, and offers possible degradation of the quality of said products. In the refinery, hydrogen sulfide is particularly undesirable due to its corrosive action on expensive equipment and its interference in certain manufacturing processes.

The problem of removing hydrogen sulfide from hydrocarbon gases has received widespread consideration from all branches of the oil, gas and fuel industry, and the literature on this subject includes numerous patents for proposed commercial processes. There are many purely chemical processes which are expansive from the standpoint of operation and consumption of chemicals. There are also many described cyclic processes which use an absorbing solution which may be regenerated, as well as a few processes which purport to be catalytic conversion operations. These latter types are designed for uses with gases high in hydrogen sulfide, say from 100 to 5000 grains per 100 cubic feet.

The art in recent years has been greatly concerned with the production of salable by-products from hydrogen sulfide subsequent to its removal from gases, this development being due to the desire to pay all or part of the cost of fairly expensive purification of a gas high in hydrogen sulfide by means of a by-product such as elemental sulfur or sulfuric acid. Most of these processes, however, are indirect, requiring first the removal and separation of hydrogen sulfide, followed by a conversion of the hydrogen sulfide to a product having commercial value.

On the other hand, direct conversion processes, for instance catalytic conversions, are not numerous, nor are those proposed very efficient due to these facts: (1) When the conversion of the sulfur from hydrogen sulfide goes beyond elemental sulfur, a multiplicity of compounds may be and usually is formed, reducing the production of any desired product; (2) equilibrium conditions in the catalysts are usually reached before conversion is complete which results in incomplete removal of hydrogen sulfide. Thus according to the second condition, if the raw gas is very high in hydrogen sulfide, a relatively large concentration of the same may be left in the partially purified gas, necessitating a further treatment perhaps by a different reagent.

U. S. Patent 1,922,872 issued to A. P. Thompson describes a process for the catalytic conversion of hydrogen sulfide in gases to elemental sulfur using a catalyst of bauxite or bauxite impregnated with iron oxide. This process as described, however, fails to qualify the completeness of removal of hydrogen sulfide, and experiments show that a large proportion of the hydrogen sulfide remains in the treated gas if the conversion is halted at elemental sulfur.

The economics governing the selection of a process to remove hydrogen sulfide from gases include several variable factors which are of interest. For example, the most efficient method of removal may well depend on the initial concentration of hydrogen sulfide and also on the lower limit to which this initial concentration must be reduced by the purification process. Thus, the most economical treatment for a gas low in hydrogen sulfide may prove wastefully expensive when applied to a gas high in hydrogen sulfide. Also, the inherent limitations of a purification process may prevent its being used in those cases where nearly 100 per cent removal of hydrogen sulfide is required.

An important object of our invention is to provide an efficient economical catalytic conversion process for the removal of hydrogen sulfide from hydrocarbon gas.

A further important object of our invention is to provide a catalytic conversion process for the removal of hydrogen sulfide from hydrocarbon gas by substantially complete conversion of the hydrogen sulfide directly to a valuable by-product and thus produce simultaneously a satisfactorily purified gas and a salable by-product.

Figures 1 and 2 are graphical representations of conditions present during the removal of hydrogen sulfide from hydrocarbon gas by a catalytic conversion process.

The treating of "sour" gases, those containing large amounts of hydrogen sulfide, is usually considered within the province of those purification processes which are either cyclic or catalytic, since such operations do not entail a costly consumption of chemicals and in addition make available a large quantity of hydrogen sulfide for conversion to salable by-products. For example, a gas containing 1 per cent by volume of hydrogen sulfide is a potential source of about 900 pounds of sulfur per million cubic feet of gas.

For the efficient treatment of gases high in hydrogen sulfide, say 500 to 6000 grains per 100 cubic feet, to produce a valuable by-product, the most desirable process must offer three advantages, namely, substantially complete removal of the hydrogen sulfide, corresponding complete conversion of the hydrogen sulfide in direct operation to the desired product, and inexpensive operation nominally within the market value of the by-product resulting from the process. Our invention is the embodiment of such a process, and is therefore an improvement on existing catalytic processes for the removal of hydrogen sulfide from hydrocarbon gas by means of a direct catalytic conversion.

We have found that hydrogen sulfide in hydrocarbon gases may be directly and efficiently oxidized to elemental sulfur by means of air or oxygen in the presence of a cheap and rugged catalyst, the process requiring only admixture of air or oxygen with the raw gas and proper control of the conversion reactions to obtain a gas substantially free of hydrogen sulfide. The present invention relates specifically to the control of the conversion reaction. The sulfur resulting from this process is a valuable by-product which, when gases high in hydrogen sulfide are being treated, may pay the cost of the purification process.

As catalyst for the oxidation step of our process, beauxitic ores are particularly effective, exhibiting both long life and high activity. Other catalysts such as synthetic aluminas and clay-type minerals exhibit fair activity, but their activities and physical properties are far inferior to a bauxite type catalyst. The bauxite type catalyst suffers little loss of activity after treating enormous volumes of very sour gas. If diminishing activity is encountered, the catalyst may be regenerated by burning out with air.

In operating our process we prefer to mix the raw gas containing more than 500 grains of hydrogen sulfide per 100 cubic feet with air or oxygen, the amount of available oxygen thus admixed being more or less in excess of the theoretical requirement for oxidation of the total hydrogen sulfide content of the gas to elemental sulfur. This gaseous mixture is passed through a bed of catalyst at the desired temperature in a suitable chamber and at very high flow rates. The catalyst bed is maintained within the temperature range corresponding to maximum catalytic activity, with only a partial preheating of the incoming gas stream because the oxidation reaction is exothermic and once started supplies a considerable proportion of the necessary heat.

The oxidation of hydrogen sulfide to elemental sulfur over a bauxite catalyst takes place at commercially significant rates at temperatures between 280° and 580° F., but the optimum range for operation according to the first step of our process is between about 450° and 570° F. Below 450° F., longer contact time is necessary to obtain satisfactory oxidation, while above 570° F. the oxidation of sulfur to sulfur dioxide tends to predominate. When operating within this range of 450° to 570° F., sulfur resulting from the oxidation reaction remains in vapor form and is carried out of the catalyst bed by the gas stream. Thus, there is no necessity for shut-downs to clean out the catalyst, and the sulfur is satisfactorily collected by cooling the gas stream leaving the catalyst chamber sufficiently to allow agglomeration and/or solidification of the elemental sulfur.

The mixture of air (or oxygen) and raw gas is passed over the catalyst at a rate calculated to result in contact or reaction times of from about 0.1 to about 2 seconds, depending on the temperature of the catalyst and the hydrogen sulfide content of the raw gas. The amount of excess air (or oxygen) ranges from 10 to 50 per cent of the theoretical requirement, although as much as 100 per cent excess may be used without appreciable formation of sulfur dioxide in the lower portion of our temperature range.

The pressure maintained on the catalyst chamber may vary from atmospheric to about 200 pounds per sq. in. or more. In general, fairly low superatmospheric pressures are effective.

We have found that the passage of raw gas containing about 500 grains per 100 cubic feet of hydrogen sulfide in admixture with air over a bauxite type catalyst between about 450 and 570° F. results in the oxidation of about 85 per cent of the hydrogen sulfide to elemental sulfur, with a negligible concurrent formation of sulfur dioxide. However, at this stage of conversion, equilibrium conditions are apparently obtained in the oxidation reaction $$H_2S(gas) + O_2(gas) \rightleftharpoons H_2O(gas) + S° \quad (1)$$

and further conversion is halted. Thus, at one step, the substantially complete oxidation of hydrogen sulfide to elemental sulfur is not possible without displacing the equilibrium of equation (1) to the right by proper manipulation of operating conditions by means of our invention.

We have now discovered that the most important factor governing the extent of reaction according to the above equation is the partial pressure of water vapor in the outlet or treated gas. For illustration of the magnitude of the effect of water vapor in gas being treated to oxidize hydrogen sulfide to elemental sulfur over a bauxitic catalyst, reference is made to Figure 1. Here it is seen that in treating a gas containing 500 grains of hydrogen sulfide per 100 cubic feet, the percentage removal of hydrogen sulfide drops from 86 per cent to 42 per cent as the percentage of water vapor in the outlet gas increases from 0.9 percent to 12.9 per cent.

In view of this discovery, we prefer to operate our process on substantially dry raw inlet gas. Figure 2 shows the variation of the percentage removal of hydrogen sulfide from dry raw gas of hydrogen sulfide content between 100 and 1100 grains per 100 cubic feet. It is noted that the percentage conversion decreased as the hydrogen sulfide content decreased, therefore, the effect of water is greatest when efforts are made to reduce the hydrogen sulfide content sufficiently low to permit utilization of the gas for commercial or domestic purposes.

Preliminary drying to promote more complete oxidation of hydrogen sulfide, however, has limitations, due to the fact that the oxidation reaction produces water vapor in an amount corresponding to the amount of hydrogen sulfide oxidized. Thus we have discovered that the maximum removal we can obtain at a one-pass oxidation over our catalyst agrees closely with values on the curve of Figure 2. The residual hydrogen sulfide in once-treated gas then varies from 5 to 15 per cent of the original amount, in case no further refinements are made in the initial oxidation step.

In treating gases of relatively low sulfur content we have discovered that we can increase the percentage removal of hydrogen sulfide by incorporating in the catalyst bed a drying agent which removes water vapor and thereby allows more complete oxidation. Such a drying agent may be placed midway of the catalyst bed, or in such a position that the dried gas still contacts a sufficient volume of catalyst to allow oxidation of a large percentage of the hydrogen sulfide remaining therein, and which would otherwise pass on in the outlet gas. Calcium oxide may serve as the drying agent, or any other dehydrating agent which will perform at the desired temperature level may be used in this process.

An alternative, and one which we find useful with gases high in hydrogen sulfide, is to operate our oxidation process in two stages with an intermediate operation to remove water and sulfur from the first stage, and a clean-up oxidation of residual hydrogen sulfide in the second stage.

In operating such a two-stage catalytic process, the hot gas from the first catalyst chamber is cooled, and the sulfur vapor carried therein is allowed to condense in a suitable collecting device. The gas substantially freed of elemental sulfur is then led through a scrubber of conventional design containing a suitable efficient dehydrating reagent for removal of the water vapor or liquid.

After removal of the water vapor, the gas stream is then passed through a heating coil wherein necessary heat is supplied, and the heated gas with the proper amount of air is passed through a second, separate bed of catalyst in a suitable chamber. This catalyst is maintained at a temperature within the range of 450 to 570° F., and oxidation of from about 75 to 85 per cent of the residual hydrogen sulfide results. Optimum results are usually obtained at temperatures between 450° and 500° F. in this second treatment because with a low concentration of hydrogen sulfide the supply of oxygen must be extremely carefully regulated to suppress the formation of sulfur oxides. Following the second catalyst chamber, the gas is cooled and given the necessary treatment for the removal of elemental sulfur. The treated gas contains only from 1 to 3 per cent of the original hydrogen sulfide along with unreacted air, the hydrocarbons being unchanged.

The completeness of removal varies with the original hydrogen sulfide content of the raw gas. Thus, the higher the hydrogen sulfide content, the greater the percentage removed, and with gases containing over 1000 grains per 100 cubic feet, 98 to 99 per cent removal is customary by our two-stage treatment. This efficient desulfurization is made possible only by the intermediate dehydration step between the first and second catalytic oxidation operations, and this dehydration is an integral part of our process.

Since the foregoing disclosure is in the nature of an exemplary operation, only one specific example is included here.

A natural gas containing 1000 grains of hydrogen sulfide per 100 cubic feet was mixed with air in an amount sufficient to provide a 10 per cent excess of oxygen over the theoretical requirement for oxidation of the total hydrogen sulfide to free sulfur. The gaseous mixture was heated to 460° F. and passed over a catalyst bed of dehydrated 20 to 40 mesh bauxite at a flow rate which resulted in a contact time of 0.4 second. The catalyst bed was maintained at 460° F. by control of the preheater output after reaction had started. The effluent gas from the catalyst tower was passed through a water condenser in which the gas temperature was lowered to 100° F. to allow particles of solid sulfur to be collected in a trap fitted with a filter device on the outlet. The gas leaving the sulfur trap was analyzed and found to contain 80 grains of hydrogen sulfide per 100 cubic feet, indicating a 92 per cent removal in the initial oxidation step. Intermittent analysis of the effluent gas throughout a 60 hour run indicated an average hydrogen sulfide removal of 92 per cent for the run, which would have been the ultimate for single-stage operation without practice of our invention.

The gas stream from the sulfur trap was then connected to a drying tower packed with dehydrated bauxite for the removal of water vapor, and the dried gas stream containing 80 grains per 100 cubic feet of residual hydrogen sulfide was then heated to 465° F. and passed through a second catalyst tower containing 20 to 40 mesh dehydrated bauxite. The second catalyst was maintained at 465° F., and the effluent gas after removal of solid sulfur by a second condenser and trap was analyzed. Analyses on the effluent gas during a 60-hour run showed an average of 20 grains of hydrogen sulfide per 100 cubic feet, or a total removal in the two stages of 98 per cent.

The possible process modifications within the scope of our invention will be obvious to those skilled in the art. The actual arrangement of apparatus for conducting our process is a matter of individual choice and requires no unfamiliar equipment.

Proper metering devices for proportioning air (or oxygen) into the raw gas stream and means of regulating the temperature of the catalyst beds within the optimum temperature range are matters familiar to those skilled in the art. Further, the methods of securing heat exchange and for cooling the treated gas for condensation of the elemental sulfur will depend on the selection of equipment for the particular gas to be treated. If desirable, partial cooling will allow the collection of liquid sulfur in a suitable separator or trap, and will also reduce the amount of heat which must be supplied to the gas stream prior to the second oxidation step.

Reagents useful for dehydrating the gas stream are familiar to the industry, and several which are adapted to regeneration are available. Especially effective among such drying agents is dehydrated bauxite which when used at lowered temperatures between 50 and 150° F. is an efficient reagent for the removal of water. Also effective are the various forms of activated alumina, calcium chloride, lithium chloride and various others. The provision of multiple scrubbers for the removal of water vapor in the dehydration step will allow uninterrupted operation while the dehydrating reagent is being regenerated.

The oxidation catalyst in the first catalyst chamber may be natural bauxite ore in convenient particle size which has been heated to 600° F. or higher for the removal of adsorbed water. In using undehydrated bauxite in our process, we find that at the beginning of operation there is a period of low activity approximating the time necessary to dehydrate the catalyst. Thus we prefer to start with dehydrated material. In our two-stage process, the catalyst for the second oxidation step must be dehydrated to obtain benefits of the dehydration stage.

We claim:

1. A process for the removal of hydrogen sulfide from normally gaseous hydrocarbons containing same which comprises admixing said gaseous hydrocarbons with a gas containing free oxygen and passing the gaseous mixture over a dehydrated bauxitic mineral catalyst at temperatures within the range of 450 to 570° F., whereby a major portion of the hydrogen sulfide is oxidized to elemental sulfur and water vapor, passing the effluent gas stream still containing hydrogen sulfide through a cooling and collecting device for the removal of elemental sulfur, thence through a drying tower containing a dehydrating agent under conditions which will substantially completely remove water vapor, then passing the dry gas stream through a second bed of well-dehydrated bauxitic mineral catalyst at a temperature within the range of 450 to 570° F., whereby a major portion of the remaining hydrogen sulfide is oxidized to elemental sulfur and water vapor, treating the effluent gas stream from the second catalytic treatment to collect and remove the elemental sulfur, thereby obtaining a purified hydrocarbon gas.

2. A process for the removal of hydrogen sulfide from normally gaseous hydrocarbons containing same which comprises admixing said gaseous hydrocarbons with a gas containing free oxygen, preheating the gaseous mixture and passing it over a dehydrated bauxite mineral catalyst at temperatures between about 450 and 570° F. and flow rates resulting in a contact time within the range of 0.1 to 2 seconds to convert a major portion of the hydrogen sulfide to sulfur and water vapor, passing the effluent gas stream still containing hydrogen sulfide through a cooling and collecting device for the removal of elemental sulfur, thence through a drying tower containing a dehydrating reagent under conditions which will substantially completely remove water vapor, and then passing the dehydrated gas stream through a second bed of well-dehydrated bauxite mineral catalyst at temperatures between about 450 and 570° F. and at flow rates resulting in contact times within the range of 0.1 to 2 seconds to convert substantially all the remaining hydrogen sulfide to free sulfur and water vapor, treating the effluent gas stream from the second catalytic treatment to collect and remove free sulfur, and obtaining thereby a purified hydrocarbon gas.

3. A process for producing free sulfur and water as substantially the sole oxidation products from hydrogen sulfide contained in normally gaseous hydrocarbons which comprises passing said normally gaseous hydrocarbons containing hydrogen sulfide in admixture with gas containing free oxygen over a dehydrated bauxite catalyst at temperatures between about 450 and 570° F., treating the gas stream to substantially completely remove water and elemental sulfur formed in the catalytic treatment and then passing the gas stream containing residual hydrogen sulfide and unreacted oxygen through a second bed of dehydrated bauxite catalyst at temperatures between about 450 and 570° F. to effect a substantially complete conversion of residual hydrogen sulfide.

4. A process for removing hydrogen sulfide from normally gaseous hydrocarbons containing same which comprises treating the raw gas to substantially completely remove water therefrom, admixing a gas containing free oxygen with the dehydrated raw gas, preheating the gas mixture and passing it over a dehydrated bauxite catalyst at a temperature between about 450 and 570° F. and at a flow rate producing contact times in the range of 0.1 to about 2 seconds whereby the hydrogen sulfide is substantially oxidized to elemental sulfur and water, cooling the catalyst chamber effluent to remove elemental sulfur, and obtaining thereby a gas of greatly decreased hydrogen sulfide content.

5. A process for the treatment of normally gaseous hydrocarbons containing hydrogen sulfide for the removal of hydrogen sulfide therefrom which comprises passing said gaseous hydrocarbons admixed with a gas containing sufficient free oxygen to oxidize the hydrogen sulfide therein over a dehydrated bauxite catalyst at a temperature in the range of 450 to about 570° F. to catalytically oxidize the major portion of the hydrogen sulfide to elemental sulfur and water vapor, cooling the effluent gas stream and removing sulfur therefrom, passing the cool gas stream over a bed of dehydrated bauxite at atmospheric temperature to substantially completely dehydrate same, and then passing the dehydrated gas stream through a second bed of dehydrated bauxite catalyst at a temperature in the range of about 450 to 570° F. to catalytically oxidize the major portion of the remaining hydrogen sulfide to elemental sulfur and water vapor, treating the effluent gas from the second catalytic treatment to remove elemental sulfur and thereby obtaining a purified hydrocarbon gas.

6. A process for the removal of hydrogen sulfide from normally gaseous hydrocarbons containing same which comprises admixing with said normally gaseous hydrocarbons a gas containing free oxygen in moderate excess over the amount required for the complete oxidation of the hydrogen sulfide directly to free sulfur and water, preheating the gaseous mixture and passing it over a dehydrated bauxite catalyst at temperatures within the range of 450 to 570° F., treating the effluent gas stream from the catalyst to substantially completely remove free sulfur and water and then passing the gas stream containing residual hydrogen sulfide and oxygen at temperatures between about 450° and 570° F. over a second bed of dehydrated bauxite catalyst admixed with a solid dehydrating reagent having dehydrating properties at said temperatures, whereby the gas stream under treatment is maintained in a substantially dry condition, treating the effluent gas stream from the second catalyst to remove free sulfur, and obtaining thereby normally gaseous hydrocarbons substantially free of hydrogen sulfide.

7. A process for treating normally gaseous hydrocarbons containing hydrogen sulfide for the removal of same which comprises substantially completely dehydrating the raw gas, admixing therewith a gas containing free oxygen and passing the mixture at a temperature between about 450 and 570° F. over a dehydrated bauxite catalyst with which is incorporated a dehydrating reagent effective at said temperatures for the maintenance of the gas stream in substantially anhydrous condition, whereby the hydrogen sulfide is oxidized to free sulfur and water, treating the effluent gas to remove the free sulfur and thereby obtaining normally gaseous hydrocarbons with greatly decreased hydrogen sulfide content.

WALTER A. SCHULZE.
JAMES R. OWEN.